Mar. 13, 1923.
R. H. DAVIS.
THERMOMETRIC INSTRUMENT FOR INDICATING THE FRESHNESS OF AIR IN CONFINED SPACES.
FILED SEPT. 3, 1921.
1,447,968.
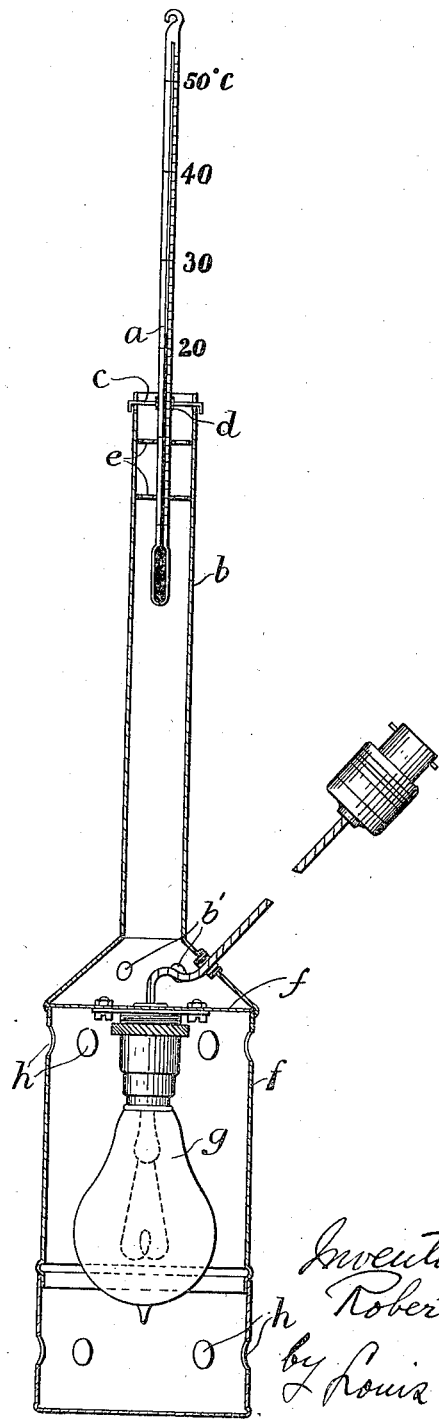

Patented Mar. 13, 1923.

1,447,963

UNITED STATES PATENT OFFICE.

ROBERT HENRY DAVIS, OF LONDON, ENGLAND.

THERMOMETRIC INSTRUMENT FOR INDICATING THE FRESHNESS OF AIR IN CONFINED SPACES.

Application filed September 3, 1921. Serial No. 498,365.

*To all whom it may concern:*

Be it known that I, ROBERT HENRY DAVIS, a subject of the King of Great Britain, residing at 187 Westminster Bridge Road, London, England, have invented a new and useful Thermometric Instrument for Indicating the Freshness of Air in Confined Spaces, of which the following is a specification.

This invention relates to a thermometric instrument for indicating the freshness of air in confined spaces.

The usual dry-bulb thermometer, commonly employed for indicating the temperature of rooms and other closed spaces, does not register the effect on the human body of the movement of the air, the extent of which largely determines the degree of freshness of the atmosphere. The object of this invention is to provide an instrument or appliance by means of which an indication of the effect of the movement of the air upon the temperature of the body can be obtained.

An instrument, constructed according to the invention, and which I term a "fresh air meter," comprises a dry-bulb thermometer, in combination with means for continuously supplying a constant quantity of heat to a jacket or the equivalent, enclosing the thermometer and exposed to the surrounding air. By this means the heat, which is imparted to the said jacket, is dissipated by radiation and by convection, the degree of loss due to the latter being dependent upon the rate of movement of the surrounding air. It will thus be seen that the temperature, indicated on the thermometer, is dependent upon the temperature and rate of motion of the air.

In a suitable construction of instrument, according to the invention, the thermometer is enclosed in a metal jacket, in which it is held centrally, out of contact with the walls thereof, the said jacket being in metallic connection with a metal case containing an electric lamp of given candle power. The heat generated in the lamp is conducted through the walls of the case, and the thermometer jacket, so as to heat the air within the latter, and thereby the thermometer bulb. The heat thus conducted to the thermometer jacket is partly radiated into the surrounding air, and partly carried away by convection, to an extent dependent upon the degree of movement of the air.

In practice, the instrument is so constructed and the thermometer so arranged, that a given standard reading, or range of readings, indicates the cooling power of the air, which is most advantageous to health, the comfort of the body, and efficiency in work.

To enable the invention to be fully understood I will describe it by reference to the accompanying drawing, which illustrates in vertical section an instrument in accordance with the invention.

$a$ is the dry-bulb thermometer and $b$ is the jacket surrounding the lower part thereof and having its exterior surface exposed to the air of the confined space the freshness of which air it is desired to obtain an indication. The thermometer is supported within the jacket $b$ at the upper part thereof by the bridge-piece $c$, the said bridge-piece having a central socket $d$ fitting the thermometer tube the lower part of which is centered within the jacket by perforated discs or distance pieces $e$. $f$ is the metal case containing an electric lamp $g$ of given candle power, with the upper part of which case the jacket $b$ is in metallic connection, the latter being enlarged at the base to the same diameter as the said case $f$. Or, any other suitable form of heating appliance may be used. $h$ indicates ventilating openings in the case $f$ to prevent over-heating of the thermometer $a$. The thermometer jacket $b$ is open at the top and is provided at its lower end preferably in the enlarged portion with apertures, indicated at $b'$—$b'$, which allow a circulation of the surrounding air upwardly through the jacket $b$ around the thermometer $a$. The lower end of the jacket $b$ is separated from the chamber $f$ containing the heating means by an imperforate partition, indicated at $f'$. There is no circulation of air from the heating chamber to the jacket $b$, the heat being conducted to the jacket $b$ merely by the walls of the respective parts.

When the instrument is in operation the heat of the lamp $g$ is conducted by way of the walls of the case $f$ and the jacket $b$ so as to heat the air within the latter and thereby the thermometer bulb. A portion of the heat thus conducted to the jacket $b$ is partly radiated and partly carried away by convection to an extent dependent upon the temperature and the degree of movement of the air of the closed space in which the instrument is located.

As an example of the working of the instrument, on a summer day, in a fresh cool room, with windows open and comfortable for work, the reading of the thermometer $a$ was from 20 to 23° C. When the air round the instrument was made relatively still by enclosed within a screen, the reading was over 40° C. An ordinary dry-bulb thermometer varied but little when screened, and, therefore, failed to show the discomfort and relaxing effect of the still air which the human body felt. It will thus be seen that by arranging the heating and ventilation of factories, schools and rooms and other closed spaces so as to maintain the reading of the fresh air meter at 20° to 23° C., cool, comfortable conditions, suitable for health and work, will be obtained.

Claims:

1. An instrument for indicating the freshness of air in confined spaces or compartments comprising a dry-bulb thermometer, a heat conducting jacket enclosing the bulb end thereof, said bulb being exposed to the air of the compartment and means for continuously supplying a constant quantity of heat to the jacket, substantially as described.

2. An instrument for indicating the freshness of air in confined spaces or compartments comprising a dry bulb thermometer, a heat conducting jacket enclosing the bulb end part of the thermometer and provided with apertures permitting the circulation of air from the said spaces or compartments though said jacket, a heat conducting case in contact with said jacket but out of communication therewith, and a constant source of heat located in said heat conducting case.

3. An instrument for indicating the freshness of air in confined spaces or compartments, comprising a heat conducting case provided with apertures, a vertically disposed heat conducting jacket in contact with said case but separated thereform by an imperforate wall, said jacket being provided adjacent to its upper and lower ends with apertures communicating with the surrounding air, a dry bulb thermometer supported in the upper end of said jacket out of contact with the walls thereof, and an electric heating device within said heating case.

ROBERT HENRY DAVIS.